(12) United States Patent
Miyata et al.

(10) Patent No.: US 8,050,803 B2
(45) Date of Patent: Nov. 1, 2011

(54) POWER FEEDING SYSTEM, ELECTRICAL APPARATUS, POWER FEEDING APPARATUS, AND COMPUTER READABLE STORAGE MEDIUM

(75) Inventors: Masahiko Miyata, Kanagawa (JP); Seiji Honda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 257 days.

(21) Appl. No.: 11/727,513

(22) Filed: Mar. 27, 2007

(65) Prior Publication Data

US 2008/0067997 A1   Mar. 20, 2008

(30) Foreign Application Priority Data

Sep. 20, 2006 (JP) ................................. 2006-254986
Oct. 6, 2006 (JP) ................................. 2006-274861

(51) Int. Cl.
*G05B 11/01* (2006.01)
*G05D 7/00* (2006.01)
*G01R 19/00* (2006.01)
*H02J 3/12* (2006.01)

(52) U.S. Cl. .......... 700/286; 700/22; 700/295; 700/297; 323/318; 340/12.32; 702/64

(58) Field of Classification Search .............. 700/22, 700/286, 295, 297; 323/318; 702/64; 340/12.32
See application file for complete search history.

(56) References Cited

U.S. PATENT DOCUMENTS

| | | | | |
|---|---|---|---|---|
| 4,347,575 A | * | 8/1982 | Gurr et al. | ...................... 700/295 |
| 4,675,648 A | | 6/1987 | Roth et al. | |
| 5,572,438 A | * | 11/1996 | Ehlers et al. | ................... 700/295 |
| 5,608,646 A | * | 3/1997 | Pomatto | ........................ 700/286 |
| 5,696,695 A | * | 12/1997 | Ehlers et al. | ................... 700/286 |
| 6,178,362 B1 | * | 1/2001 | Woolard et al. | ................ 700/295 |
| 6,832,135 B2 | * | 12/2004 | Ying | ............................... 700/295 |
| 6,868,293 B1 | * | 3/2005 | Schurr et al. | .................... 700/22 |
| 7,069,117 B2 | * | 6/2006 | Wilson et al. | .................. 700/295 |
| 7,320,078 B2 | | 1/2008 | Balestriere | |
| 7,379,997 B2 | * | 5/2008 | Ehlers et al. | ................... 709/224 |

(Continued)

FOREIGN PATENT DOCUMENTS

JP   A 56-139046   10/1981

(Continued)

OTHER PUBLICATIONS

Jan. 20, 2010 Office Action issued in U.S. Appl. No. 11/727,510.

(Continued)

*Primary Examiner* — Albert Decady
*Assistant Examiner* — Jennifer Norton
(74) *Attorney, Agent, or Firm* — Oliff & Berridge, PLC

(57) ABSTRACT

A power feeding system includes a power feeding apparatus and a power line communication unit. The power feeding apparatus feeds power from a power line to an external apparatus. The power line communication unit communicates via the power line, which is a communication medium. The power feeding apparatus includes an acquisition unit, a restriction unit and a determination unit. The acquisition unit acquires restriction information used to restrict the feeding of the power to the external apparatus. The restriction unit restricts the feeding of the power to the external apparatus to which the power feeding apparatus is to feed the power. The determination unit determines as to whether or not the restriction unit has to restrict the feeding of the power, based on the restriction information acquired by the acquisition unit.

11 Claims, 16 Drawing Sheets

U.S. PATENT DOCUMENTS

| | | | |
|---|---|---|---|
| 7,813,842 B2 * | 10/2010 | Iwamura | 700/292 |
| 7,826,932 B2 * | 11/2010 | Cargnelli et al. | 700/292 |
| 2001/0010032 A1 * | 7/2001 | Ehlers et al. | 702/62 |
| 2003/0107471 A1 | 6/2003 | Tsubone | |
| 2004/0153170 A1 * | 8/2004 | Santacatterina et al. | 700/1 |
| 2004/0254654 A1 * | 12/2004 | Donnelly et al. | 700/22 |

FOREIGN PATENT DOCUMENTS

| | | |
|---|---|---|
| JP | A 62-164324 | 7/1987 |
| JP | A 2-0234545 | 9/1990 |
| JP | A 5-103425 | 4/1993 |
| JP | A 9-36971 | 2/1997 |
| JP | A 9-050590 | 2/1997 |
| JP | A 11-230998 | 8/1999 |
| JP | A 2001-256585 | 9/2001 |
| JP | A 2002-142385 | 5/2002 |
| JP | A 2003-508002 | 2/2003 |
| JP | A 2003-199241 | 7/2003 |
| JP | A 2003-283389 | 10/2003 |
| JP | A 2004-064355 | 2/2004 |
| JP | A 2004-364463 | 12/2004 |
| JP | A 2006-245983 | 9/2006 |
| WO | WO 01/15300 A1 | 3/2001 |

OTHER PUBLICATIONS

Office Action issued in U.S. Appl. No. 11/727,510 on Aug. 20, 2010.

* cited by examiner

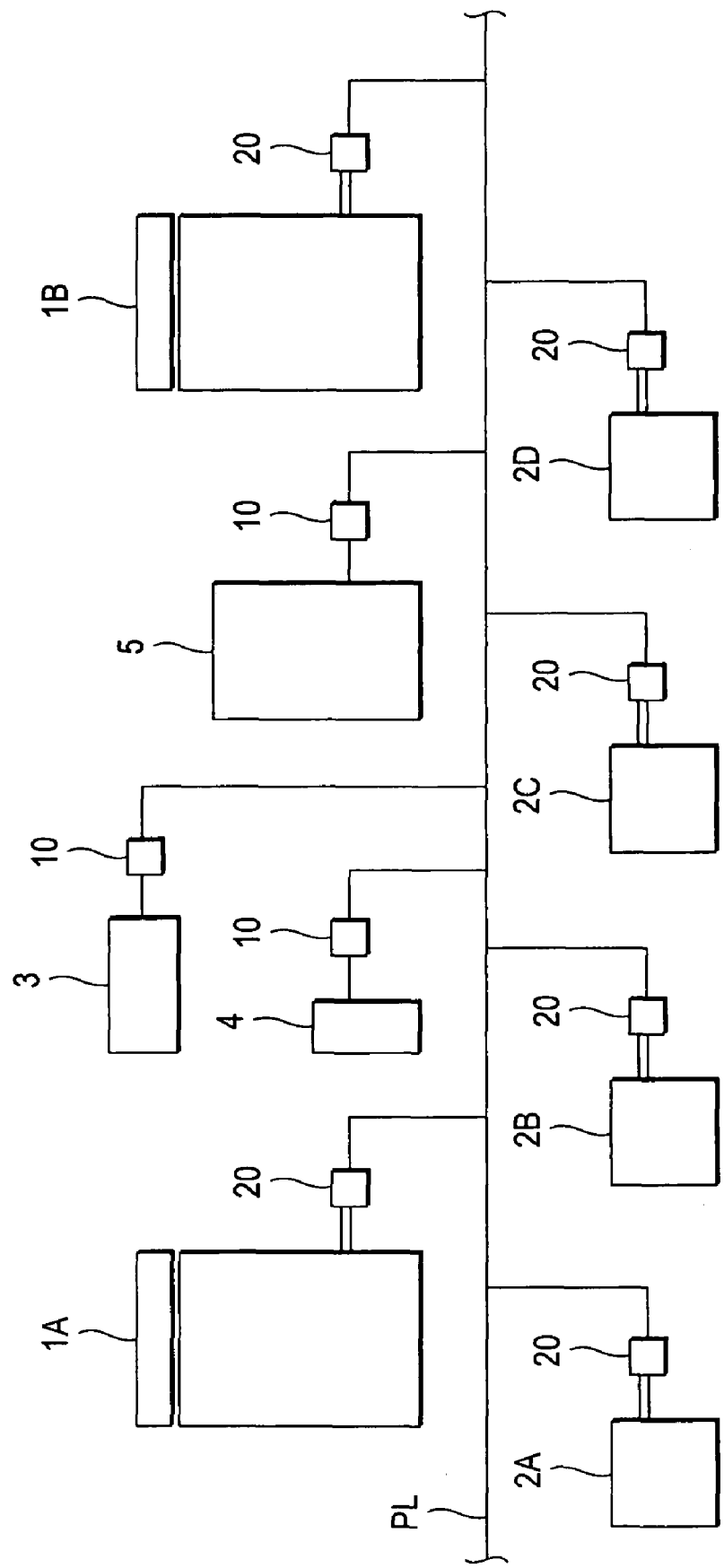

FIG. 9

| SERIAL NUMBER | COMMUNICATION FUNCTION | TYPE OF EXTERNAL APPARATUS | OPERATION MODE | MONITORING VALUE | CUT-OFF LEVEL | CONTINUOUS MONITORING TIMER | ABNORMAL COUNT |
|---|---|---|---|---|---|---|---|
| 1 | ○ | PC | IN USE | | | | |
| | | | LCD OFF | | | | |
| | | | STANDBY | | | | |
| | | | OFF | | | | |
| 2 | × | HUMIDIFIER | | | | | |
| 3 | ○ | MULTI-FUNCTION MACHINE | IN JOB | | | | |
| | | | STANDBY | | | | |
| | | | LPM | | | | |
| | | | SLM | | | | |
| 4 | ○ | PC | IN USE | | | | |
| | | | LCD OFF | | | | |
| | | | STANDBY | | | | |
| | | | OFF | | | | |
| 5 | ○ | MULTI-FUNCTION MACHINE | IN JOB | | | | |
| | | | STANDBY | | | | |
| | | | LPM | | | | |
| | | | SLM | | | | |
| 6 | ○ | PC | IN USE | | | | |
| | | | LCD OFF | | | | |
| | | | STANDBY | | | | |
| | | | OFF | | | | |
| 7 | × | AIR CONDITIONER | | | | | |
| 8 | × | REFRIGERATOR | | | | | |
| 9 | ○ | PC | IN USE | | | | |
| | | | LCD OFF | | | | |
| | | | STANDBY | | | | |
| | | | OFF | | | | |

FIG. 10

| MONITORING UNIT | A |
|---|---|

| SERIAL NUMBER | COMMUNICATION FUNCTION | TYPE OF EXTERNAL APPARATUS | OPERATION MODE | MONITORING VALUE | CUT-OFF LEVEL | CONTINUOUS MONITORING TIMER | ABNORMAL COUNT |
|---|---|---|---|---|---|---|---|
| 1 | ○ | PC | IN USE | 2A | 10% | 1 SECOND | THREE TIMES |
| | | | LCD OFF | 1A | 20% | 5 SECOND | TWICE |
| | | | STANDBY | 0.5A | 20% | 5 SECOND | TWICE |
| | | | OFF | 0.1A | 20% | 5 SECOND | TWICE |
| 2 | × | HUMIDIFIER | IN USE | 3A | 5A | 1 SECOND | ONCE |
| | | | OFF | 1A | 3A | 5 SECOND | TWICE |
| 3 | ○ | MULTI-FUNCTION MACHINE | IN JOB | 14A | 10% | 1 SECOND | THREE TIMES |
| | | | STANDBY | 3A | 20% | 5 SECOND | TWICE |
| | | | LPM | 2A | 20% | 5 SECOND | TWICE |
| | | | SLM | 0.1A | 20% | 5 SECOND | TWICE |
| 4 | ○ | PC | IN USE | 2A | 10% | 1 SECOND | THREE TIMES |
| | | | LCD OFF | 1A | 20% | 5 SECOND | TWICE |
| | | | STANDBY | 0.5A | 20% | 5 SECOND | TWICE |
| | | | OFF | 0.1A | 20% | 5 SECOND | TWICE |
| 5 | ○ | MULTI-FUNCTION MACHINE | IN JOB | 14A | 10% | 1 SECOND | THREE TIMES |
| | | | STANDBY | 3A | 20% | 5 SECOND | TWICE |
| | | | LPM | 2A | 20% | 5 SECOND | TWICE |
| | | | SLM | 0.1A | 20% | 5 SECOND | TWICE |

| | | | | | | |
|---|---|---|---|---|---|---|
| 6 | ○ | PC | IN USE | 2A | 10% | 1 SECOND | THREE TIMES |
| | | | LCD OFF | 1A | 20% | 5 SECOND | TWICE |
| | | | STANDBY | 0.5A | 20% | 5 SECOND | TWICE |
| | | | OFF | 0.1A | 20% | 5 SECOND | TWICE |
| 7 | × | AIR CONDITIONER | IN USE | 14A | 10% | 1 SECOND | THREE TIMES |
| | | | STANDBY | 5A | 20% | 5 SECOND | TWICE |
| | | | OFF | 0.1A | 20% | 5 SECOND | TWICE |
| 8 | × | REFRIGERATOR | IN USE | 14A | 10% | 1 SECOND | ONCE |
| | | | STANDBY | 5A | 20% | 5 SECOND | TWICE |
| 9 | ○ | PC | IN USE | 2A | 10% | 1 SECOND | THREE TIMES |
| | | | LCD OFF | 1A | 20% | 5 SECOND | TWICE |
| | | | STANDBY | 0.5A | 20% | 5 SECOND | TWICE |
| | | | OFF | 0.1A | 20% | 5 SECOND | TWICE |

POWER FEEDING SYSTEM, ELECTRICAL APPARATUS, POWER FEEDING APPARATUS, AND COMPUTER READABLE STORAGE MEDIUM

CROSS-REFERENCE TO RELATED APPLICATIONS

This application is based on and claims priority under 35 U.S.C. §119 from Japanese Patent Application No. 2006-274861 filed Oct. 6, 2006 and Japanese Patent Application No. 2006-254986 filed Sep. 20, 2006.

BACKGROUND

Technical Field

The invention relates to a power feeding system, electrical apparatus, a power feeding apparatus, and a program.

SUMMARY

According to an aspect of the invention, a power feeding system includes a power feeding apparatus and a power line communication unit. The power feeding apparatus feeds power from a power line to an external apparatus. The power line communication unit communicates via the power line, which is a communication medium. The power feeding apparatus includes an acquisition unit, a restriction unit and a determination unit. The acquisition unit acquires restriction information used to restrict the feeding of the power to the external apparatus. The restriction unit restricts the feeding of the power to the external apparatus to which the power feeding apparatus is to feed the power. The determination unit determines as to whether or not the restriction unit has to restrict the feeding of the power, based on the restriction information acquired by the acquisition unit.

BRIEF DESCRIPTION OF THE DRAWINGS

Exemplary embodiments of the invention will be described in detail below with reference to the accompanying drawings wherein:

FIG. 1 is a schematic configuration view for explaining a power feeding system according to an exemplary embodiment;

FIG. 9 illustrates an initial setting table relating to the cutting off of the power;

FIG. 10 illustrates an initial setting table relating to the cutting off of the power;

DETAILED DESCRIPTION

Figure 2A:
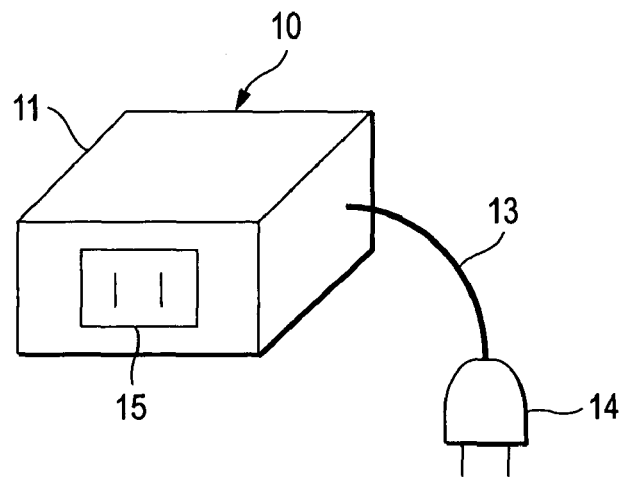
FIGS. 2A and 2B are views for explaining a power line communication apparatus.

Hereinafter, an exemplary embodiment of the invention will be described in detail with reference to the accompanying drawings.

FIG. 1 is a schematic view for explaining the configuration of a power feeding system (power monitoring system) according to this exemplary embodiment.

For example, the system shown in FIG. 1 is a system for realizing active power monitoring with respect to individual apparatuses (electrical apparatus) in an office. As shown in FIG. 1, multi-function devices 1A and 1B, personal computers (PCs) 2A, 2B, 2C, and 2D, an air conditioner 3, a humidifier 4 and a refrigerator 5, which are power consuming apparatuses, are connected to a power line PL wired from a power company to the office, through power line communication apparatuses (power feeding apparatuses) 10 and 20. That is, power flowing through the power line PL is supplied to the multi-function devices 1A and 1B, the personal computers 2A to 2D, the air conditioner 3, the humidifier 4 and the refrigerator 5 through the power line communication apparatuses 10 and 20. In other words, the multi-function devices 1A and 1B, the personal computers 2A to 2D, the air conditioner 3, the humidifier 4 and the refrigerator 5 are connected to each other through the power line communication apparatuses 10 and 20 and the power line PL.

The power line communication apparatuses 20 are attached to the multi-function devices 1A and 1B and the personal computers 2A to 2D, respectively. In addition, the power line communication apparatuses 10 are attached to the air conditioner 3, the humidifier 4 and the refrigerator 5, respectively. These power line communication apparatuses 10 and 20 have a common basic configuration but have different parts, which will be described later.

Here, the multi-function devices 1A and 1B are image apparatuses having functions of scanner, printer, facsimile and copier. The multi-function devices 1A and 1B operates by receiving the power supplied through the power line PL. The personal computers 2A to 2D are installed with various kinds of application software and are supplied with power from the power line PL so as to execute various kinds of application processing such as document creation. The air conditioner 3 is air-conditioning apparatus that cools or heats a room by using the power flowing through the power line PL. The humidifier 4 is an apparatus for increasing the humidity of a room by using the power flowing through the power line PL, and the humidifier 4 may be a vaporization-type, ultrasonic-type, heating-type, or hybrid humidifier. The refrigerator 5 is an apparatus that is used to cool and store food and drink, materials for experiment, and the like by keeping an internal space at low temperature by the use of power supplied through the power line PL.

Figure 2B:
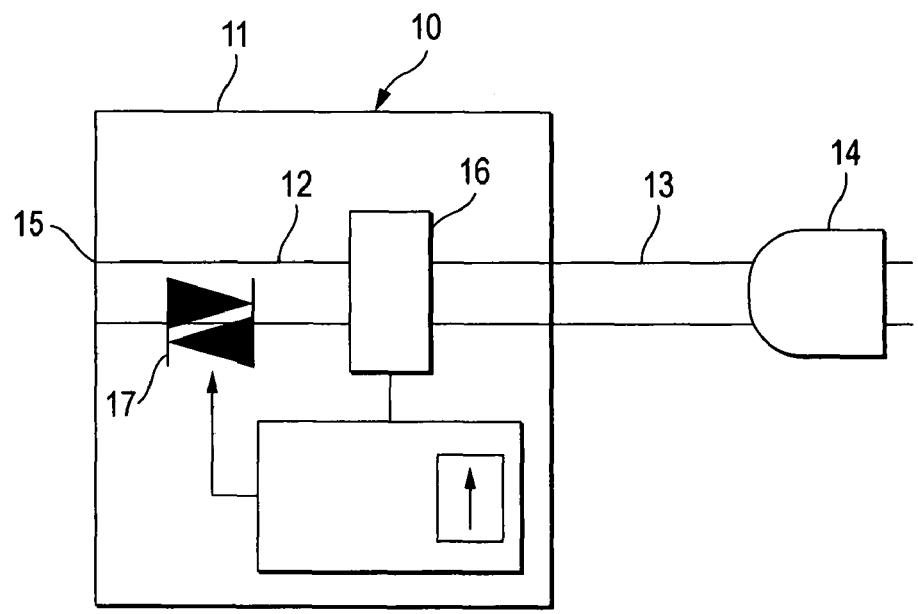

FIGS. 2A and 2B are views for explaining the power line communication apparatus 10. Specifically, FIG. 2A is a perspective view showing the external appearance of the power line communication apparatus 10. FIG. 2B is a view showing the configuration of the power line communication apparatus 10.

As shown in FIGS. 2A and 2B, the power line communication apparatus 10 includes an apparatus main body 11, a power supply line 12 (see FIG. 2B) provided inside the apparatus main body 11, and a power cord 13 that is connected to the power supply line 12 and extends from the apparatus main body 11 to the outside. Further, the power line communication apparatus 10 includes a power plug (commercial power input unit; inlet) 14, which is provided at a front end of the power cord 13 and is connected to an outlet (not shown) on the power line PL (see FIG. 1), and an outlet (output unit) 15 that is provided on an external surface of the apparatus main body 11 and outputs power from the power supply line 12 to various kinds of apparatuses (apparatuses whose power consumption is to be monitored). In addition, the power supply line 12, the power cord 13, the power plug 14, and the outlet 15 may form a power feeding unit.

Moreover, the power line communication apparatus 10 includes a unit section 16 (see FIG. 2B) provided between the power cord 13 and the outlet 15. The unit section 16 may serve as a power line communication unit and/or a power information detection unit. That is, the unit section 16 serving as the power line communication unit transmits/receives power line superimposition signals to/from other power line communication apparatuses, which are connected by the power line PL (see FIG. 1), through the power line PL. In addition, the unit section 16 serving as the power information detection unit detects power consumption input from the power line PL through the power cord 13. Thus, the power line communication apparatus 10 may be obtained by adding various kinds of intelligent functions to a table tab.

Further, the power line communication apparatus 10 includes a power switching section (switching section) 17 provided on the power supply line 12 of the apparatus main body 11. The power switching section 17 is disposed on the power supply line 12 between the unit section 16 and the outlet 15. The power switching section 17 is connected to a control section 16$b$ (see FIG. 3) so that the control section 16$b$ controls ON/OFF of the power switching section 17. That is, when the power switching section 17 switches to OFF by the control section 16$b$, supply of power to an apparatus connected to the outlet 15 is cut off.

Specifically, the power switching section 17 is disposed on the downstream side of the unit section 16 in the power flowing direction so that power can be supplied to the unit section 16 even when the power supply is cut off by the power switching section 17. In other words, it is not necessary to supply power to dedicated server external apparatus for energy saving management or dedicated external apparatus having a power monitoring function, but power may be supplied only to power communication devices of the individual apparatuses whose power is to be monitored.

Figure 3:
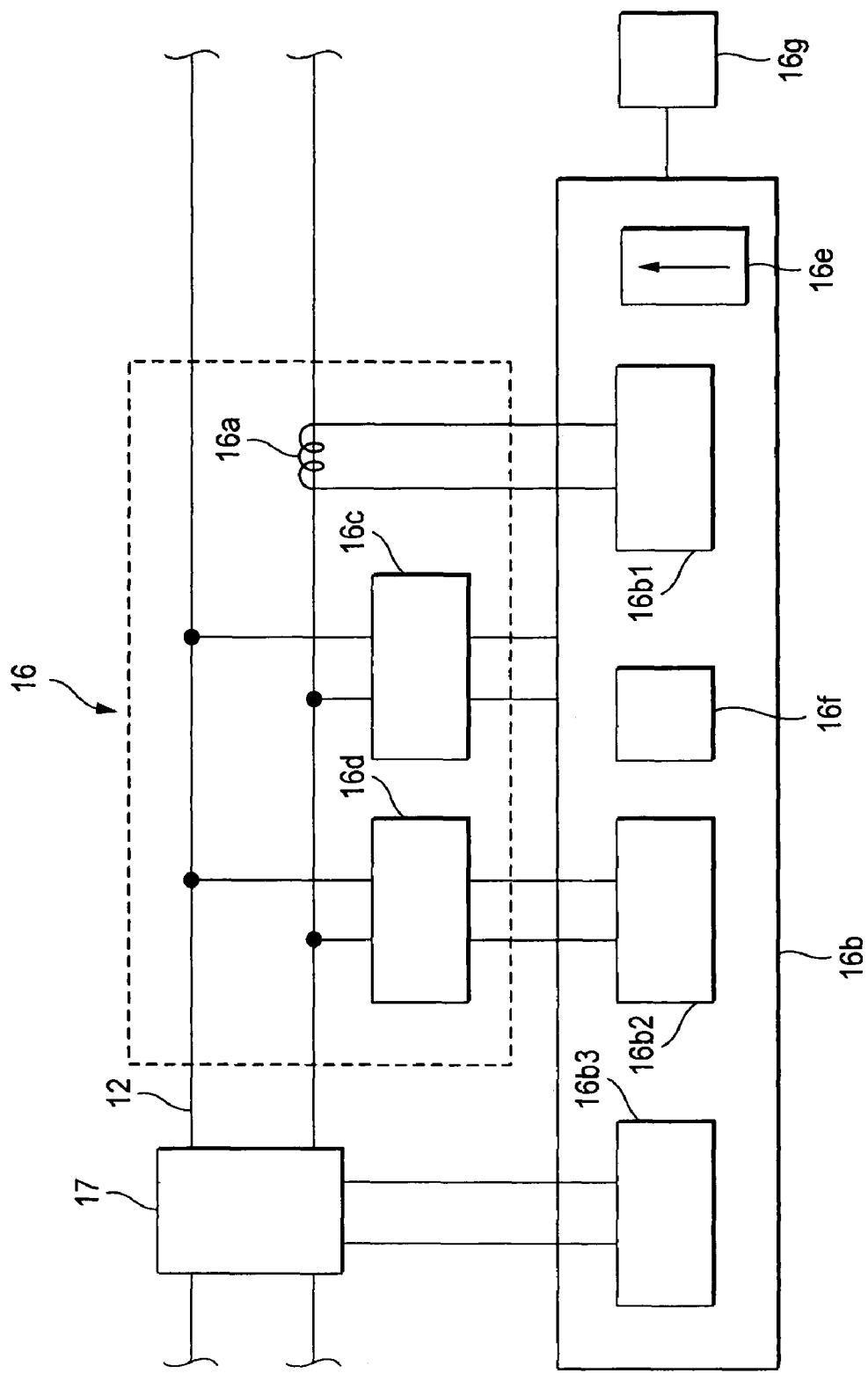
FIG. 3 is a block diagram for explaining the configuration of a unit section.

FIG. 3 is a block diagram for explaining the configuration of the unit section 16.

As shown in FIG. 3, the unit section 16 includes a clamp coil 16$a$ for detecting a current flowing through the power supply line 12 and a control section (CPU) 16$b$ that makes a control based on a result of the detection of the clamp coil 16$a$ and controls power line communication.

More specifically, the control section 16$b$ includes a power detection functioning section 16$b$1, a power line communication functioning section 16$b$2 and a power-off functioning section 16$b$3. The power detection functioning section 16$b$1 detects a power value by performing a predetermined calculation after receiving the detection result of the clamp coil 16$a$. In addition, the power line communication functioning section 16$b$2 transmits and receives predetermined signals through the power supply line 12 according to predetermined procedures. The power-off functioning section 16$b$3 cuts off the supply of power according to an instruction from the power detection functioning section 16$b$1 or the power line communication functioning section 16$b$2.

Further, the unit section 16 includes a DC power section 16$c$ and a power line communication filter 16$d$. The DC power section 16$c$ converts an AC current, which flows through the power supply line 12, into a DC current and supplies the DC current to the control section 16$b$. The power line communication filter 16$d$ cuts off signals other than signals to be transmitted and to be received between the power supply line 12 and the control section 16$b$.

Furthermore, the unit section 16 includes a number setting section (setting section) 16$e$. The number setting section 16$e$ sets a unit number of the unit section 16, a number of the apparatus main body 11, and an identification number or an unique ID number (hereinafter, referred to as "unit number"). Further, the unit section 16 includes an automatic setting section 16$f$ that automatically sets the unit number. Furthermore, the unit section 16 includes a storage section 16$g$, which is a non-volatile memory (NVM) that stores the unit number set by the number setting section 16$e$ and the automatic setting section 16$f$. Accordingly, for example, it is possible to manually set the unit number in advance by means of the number setting section 16$e$ at the time of shipment and store the manually set unit number in the storage section 16$g$ and then to automatically change the unit number, which is manually set, by means of the automatic setting section 16$f$ and store the automatically set unit number in the storage section 16$g$ when the unit section 16 is connected to the power line PL.

In addition, although the number setting section 16$e$ and the automatic setting section 16$f$ are provided in this exemplary embodiment, only one of the number setting section 16$e$ and the automatic setting section 16$f$ may be provided.

In addition, the storage section 16$g$, which is the non-volatile memory, has functions of data rewriting and data holding after power off. For example, a flash memory or an EEPROM (electronically erasable and programmable read only memory) may be used as the storage section 16$g$.

Figure 4:
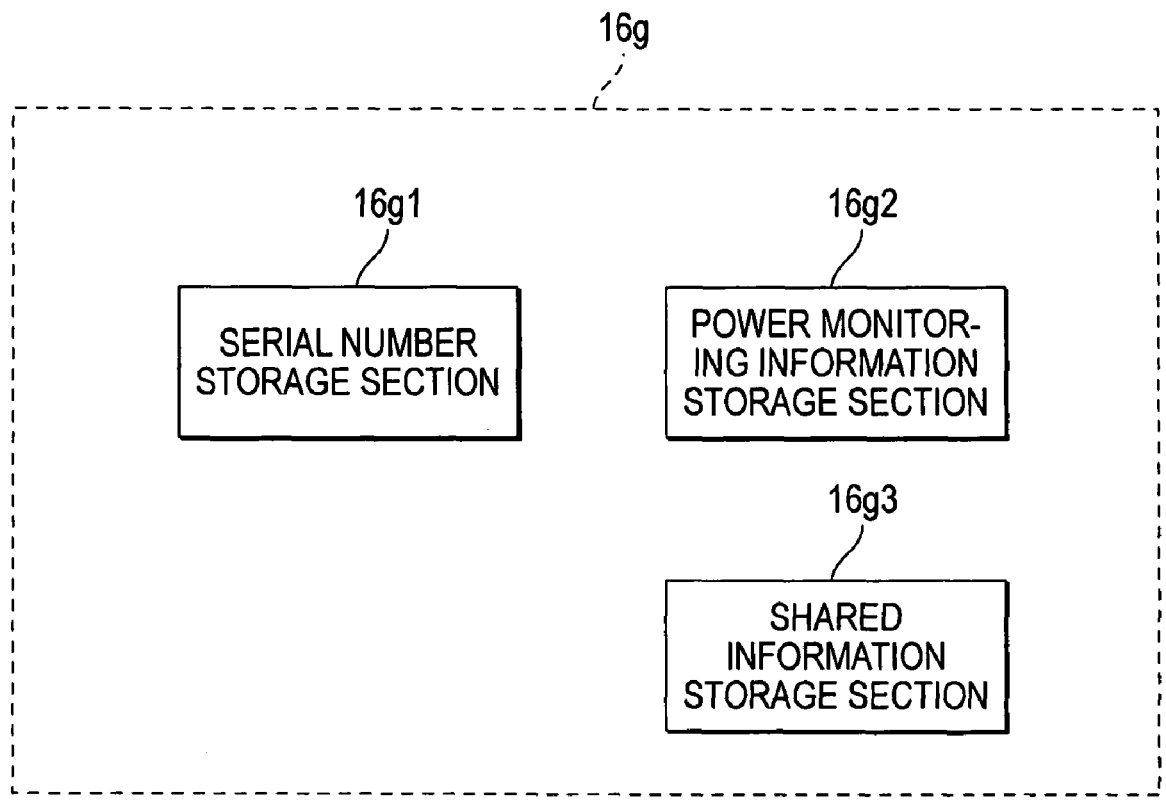
FIG. 4 is a block diagram showing a storage unit.

FIG. 4 is a block diagram showing the storage section 16$g$.

As shown in FIG. 4, the storage section 16$g$ includes a serial number storage section 16$g$1 that stores a serial number set by the number setting section 16$e$ (see FIG. 3) and the automatic setting section 16$f$ (see FIG. 3). Further, the storage section 16$g$ includes a power monitoring information storage section 16$g$2 that stores various kinds of power monitoring information. Furthermore, the storage section 16$g$ includes a shared information storage section 16$g$3 that stores information shared among different power line communication apparatuses 10 and 20 by means of the power line communication functioning section 16$b$2 (see FIG. 3).

Figure 5A:
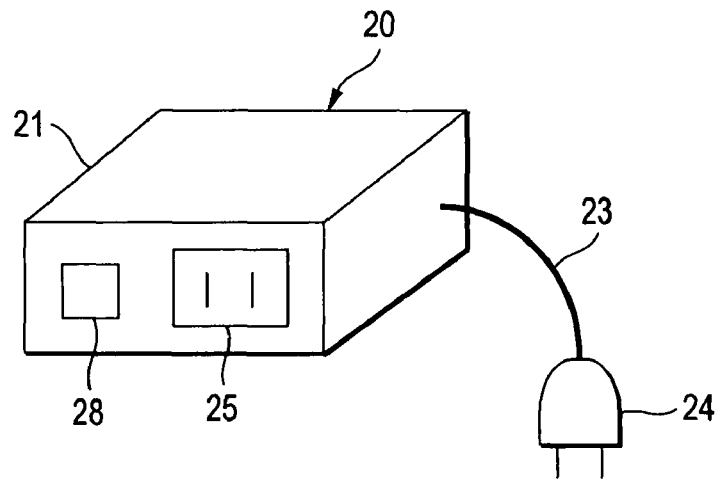
FIGS. 5A and 5B are views for explaining a power line communication apparatus.
Figure 5B:
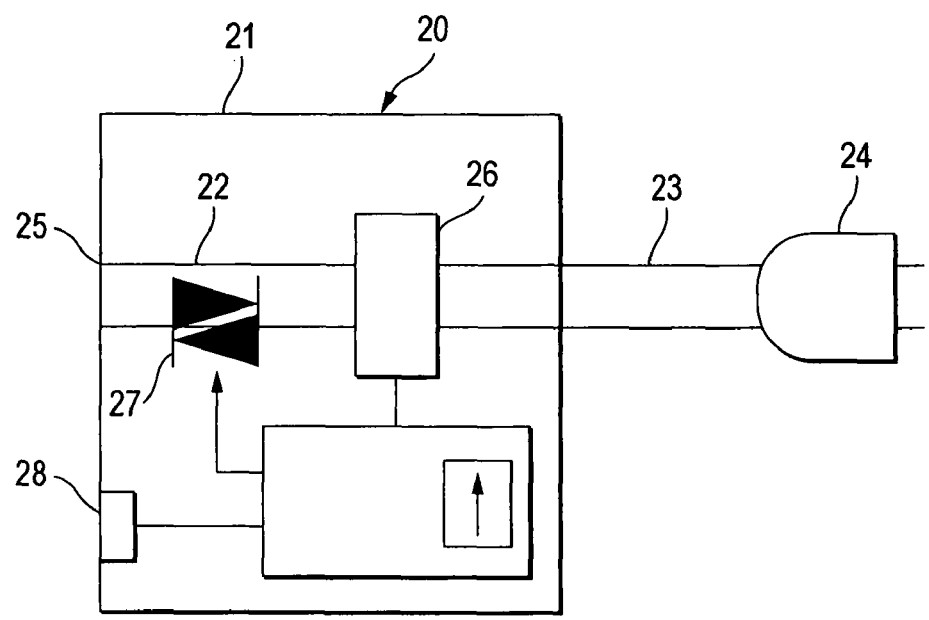

FIGS. 5A and 5B are views for explaining the power line communication apparatus 20. Specifically, FIG. 5A is a perspective view illustrating the external appearance of the power line communication apparatus 20. FIG. 5B is a view showing the configuration of the power line communication apparatus 20. The basic configuration of the power line communication apparatus 20 shown in FIGS. 5A and 5B are the same as that of the power line communication apparatus 10 shown in FIGS. 2A and 2B. That is, the power line communication apparatus 20 includes an apparatus main body 21, a power supply line 22 (see FIG. 5B), a power cord 23, a power plug 24, an outlet 25, and a power switch section 27. The apparatus main body 21, the power supply line 22, the power cord 23, the power plug 24, the outlet 25 and the power switch section 27 may respectively have the same configuration as the apparatus main body 11, the power supply line 12, the power cord 13, the power plug 14, the outlet 15, and the power switching section 17 in the power line communication apparatus 10.

In addition, the power line communication apparatus 20 includes an external interface (serving as second communication unit; separate communication unit) 28 provided on the external surface of the apparatus main body 21. For example, a USB (universal serial bus) interface or a LAN (local area network) interface may be used as the external interface 28. Thus, the power line communication apparatus 20 can transmit and receive various kinds of information through the external interface 28.

Figure 6:
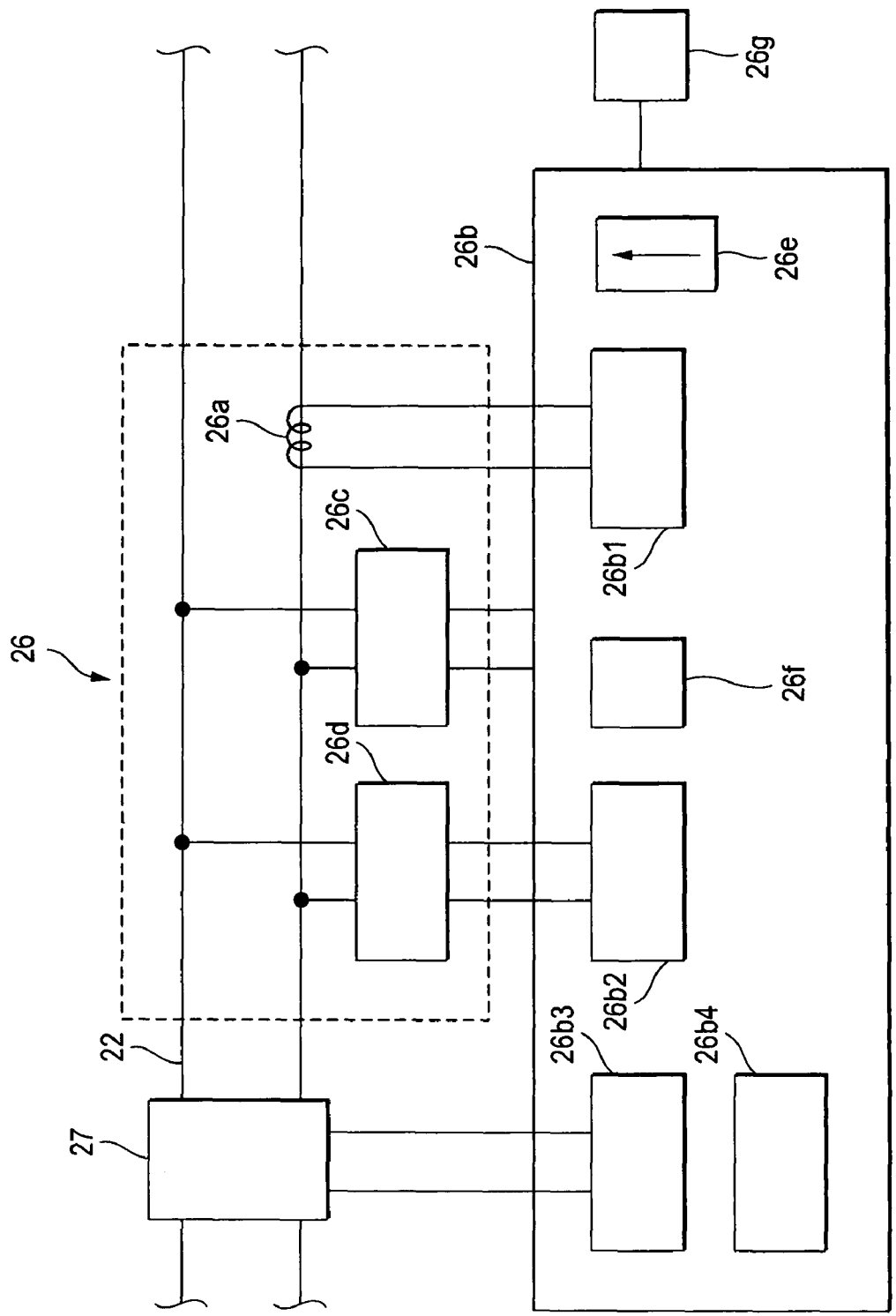
FIG. 6 is a block diagram for explaining the configuration of a unit section.

FIG. 6 is a block diagram for explaining the configuration of the unit section 26.

The basic configuration of the unit section 26 shown in FIG. 6 is the same as that of the unit section 16 shown in FIG. 3. That is, the unit section 26 includes a clamp coil 26a, a DC power section 26c, a filter 26d, a number setting section 26e, an automatic setting section 26f, and a storage section 26g. The clamp coil 26a, the DC power section 26c, the filter 26d, the number setting section 26e, the automatic setting section 26f, and the storage section 26g may respectively have the same configuration as the clamp coil 16a, the DC power section 16c, the filter 16d, the number setting section 16e, the automatic setting section 16f, and the storage section 16g in the unit section 16.

Further, the unit section 26 includes a control section 26b having a power detection functioning section 26b1, a power line communication functioning section 26b2, a power-off functioning section 26b3, and a general-purpose communication functioning section 26b4. The power detection functioning section 26b1, the power line communication functioning section 26b2, and the power-off functioning section 26b3 may respectively have the same configuration as the power detection functioning section 16b1, the power line communication functioning section 16b2, and the power-off functioning section 16b3 shown in FIG. 3. In addition, the general-purpose communication functioning section 26b4 transmits and receives predetermined signals to/from an apparatus connected to the external interface 28 on the basis of predetermined protocol.

Figure 7:
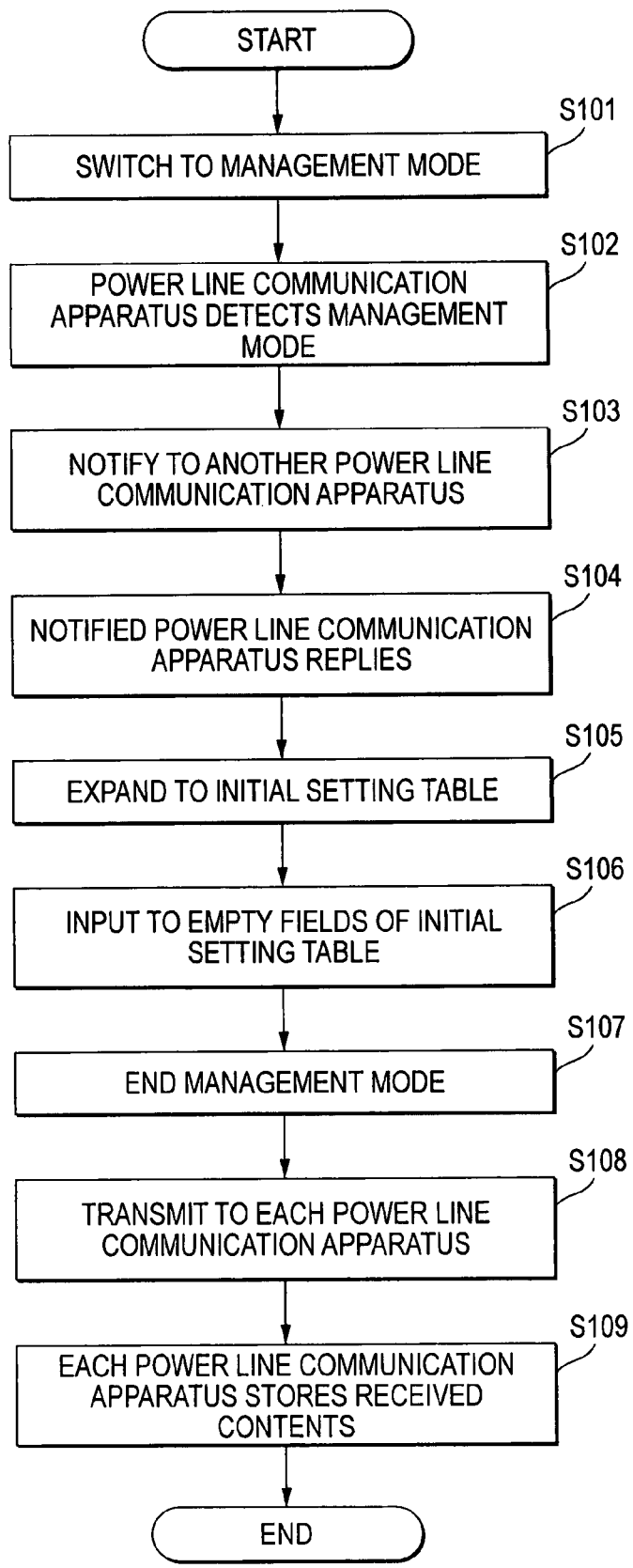
FIG. 7 is a flow chart illustrating initial setting procedures for cutting off power using a power line communication apparatus.
Figure 8:
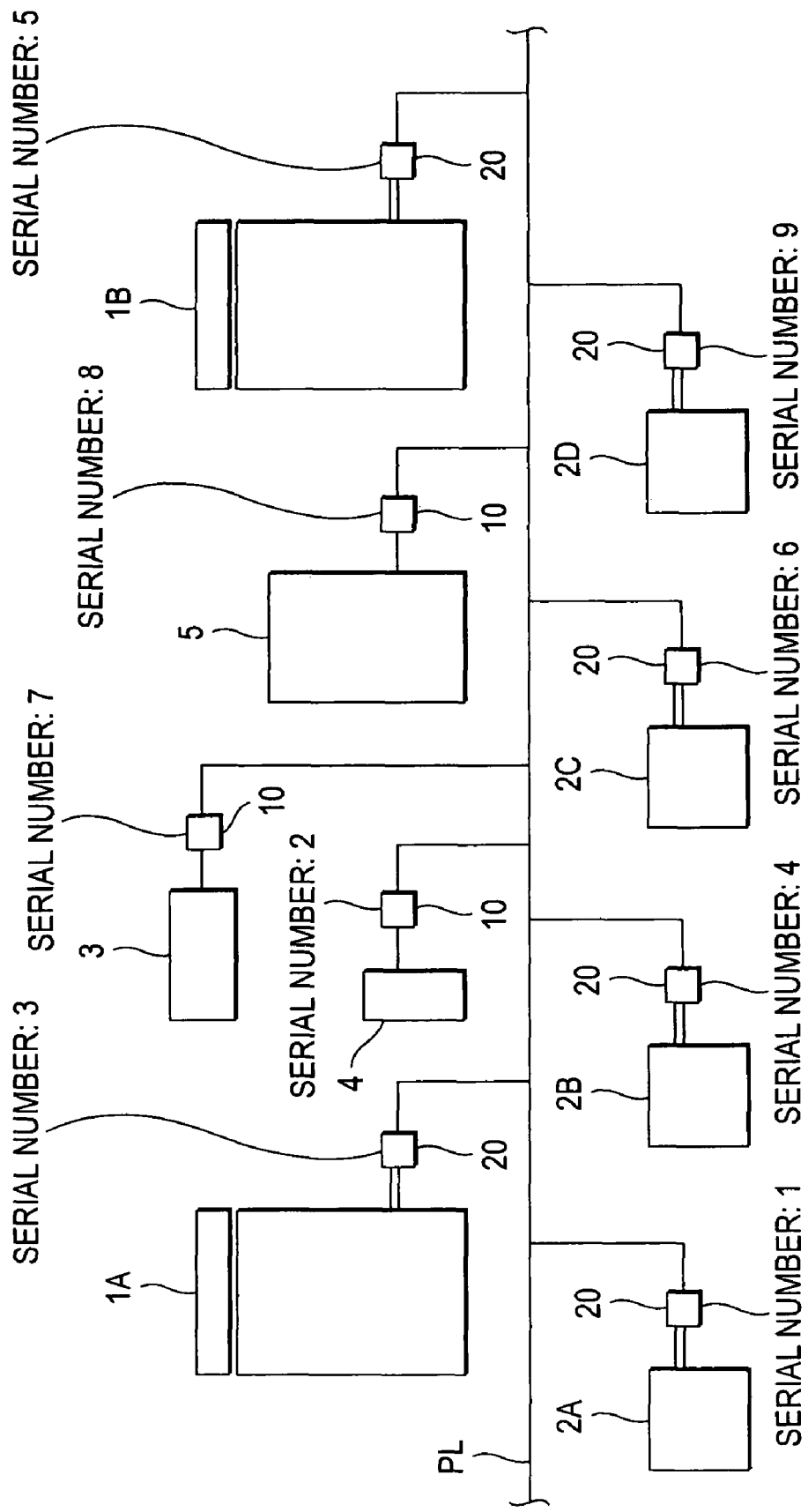
FIG. 8 is a view for explaining serial numbers assigned to the power line communication apparatuses.

FIG. 7 is a flow chart showing initial setting procedures when power is cut off using the power line communication apparatuses 10 and 20. FIG. 8 is a view explaining a serial number assigned to the power line communication apparatuses 10 and 20. FIGS. 9 and 10 are tables illustrating initial setting when power is cut off.

Here, as shown in FIG. 8, a serial number is assigned to each of the power line communication apparatuses 10 and 20 connected to the power line PL. That is, the serial number of the power line communication apparatus 20 that feeds power to the multi-function machine 1A is '3,' and the serial number of the power line communication apparatus 20 that feeds power to the multi-function machine 1B is '5.' In addition, the serial number of the power line communication apparatus 20 that feeds power to the personal computer 2A is '1,' and the serial number of the power line communication apparatus 20 that feeds power to the personal computer 2B is '4.' In addition, the serial number of the power line communication apparatus 20 that feeds power to the personal computer 2C is '6,' and the serial number of the power line communication apparatus 20 that feeds power to the personal computer 2D is '9.'

Moreover, the serial number of the power line communication apparatus 10 that feeds power to the air conditioner 3 is '7,' the serial number of the power line communication apparatus 10 that feeds power to the humidifier 4 is '2,' and the serial number of the power line communication apparatus 10 that feeds power to the refrigerator 5 is '8.'

The flow chart of FIG. 7 shows process procedures when the personal computer 2A (see FIG. 8) performs initial setting on each of the power line communication apparatuses 10 and 20 (see FIG. 8) in response to a user's instruction. In addition, an application software is installed in advance in the personal computer 2A so that the personal computer 2A can switch to a management mode for managing the power line communication apparatuses 10 and 20. In addition, even though the initial setting is performed by using the personal computer 2A in this exemplary embodiment, the initial setting may be performed by using a UI (not shown) of the multi-function machine 1A or 1B (see FIG. 8).

First, the personal computer 2A switches to the management mode in response to an instruction of a user who intends to perform initial setting (step S101). Then, the power line communication apparatus 20, which feeds power to the personal computer 2A and has the serial number '1,' detects through the general-purpose communication functioning section 26b4 (see FIG. 6) that the personal computer 2A has switched to the management mode (step S102). Then, the power line communication apparatus 20 having the serial number '1' notifies the other power line communication apparatuses 10 and 20, which are connected to each other through the power line PL (see FIG. 8), that the personal computer 2A is in the management mode by means of the power line communication functioning section 26b2 (see FIG. 6)(Step S103).

Upon receiving the notification, each of the power line communication apparatuses 10 and 20 sends back various kinds of information held therein to the power line communication apparatus 20 having the serial number '1' by the power line communication (step S104). Specifically, each power line communication apparatus 20 transmits its serial number, which is stored in the storage section 26g (see FIG. 6) thereof, by the the power line communication functioning section 26b2. Also, each power line communication apparatus 20 transmits a type of a connected apparatus to which the power line communication apparatus 20 feeds power and an operation mode of the connected apparatus by the the power line communication functioning section 26b2.

Furthermore, each power line communication apparatus 10 transmits its serial number, which is stored in the storage section 16g (see FIG. 3) thereof, by the power line communication functioning section 16b2 (see FIG. 3).

When the power line communication apparatus 20 having the serial number '1' receives the various kinds of information from the other power line communication apparatuses 10 and 20 via the power line communication, the power line communication apparatus 20 having the serial number '1' notifies the personal computer 2A of the received information by the general-purpose communication functioning section 26b4.

The personal computer 2A expands the acquired information into a table set in advance (step S105) and displays the table as shown in FIG. 9. In the initial setting table shown in FIG. 9, the acquired information is written in corresponding fields and the other fields are kept empty.

Also, an 'LCD OFF' represents that a liquid crystal monitor is powered off. In addition, an 'LPM' represents a low power mode, and an 'SLM' represents a sleep mode.

The personal computer 2A fills information in empty fields in response to the user's operation and completes the initial setting table (step S106). That is, as shown in FIG. 10, the personal computer 2A selects and inputs, for example, any one of A (Ampere) or W (Power) as a monitoring unit. Also, the personal computer 2A inputs predetermined values in fields of cut-off level, continuous monitoring timer, and abnormal count for each type of operation mode. Thus, it is possible to desirability set each type of operation mode.

Here, the "monitoring value" shown in FIG. 10 represents a reference value at which supply of power to an external apparatus is cut off. Determination as to whether or not the power is cut off is made according to whether or not a power-off condition is satisfied. The power-off condition may be satisfied if it is detected that a monitoring value is exceeded; however, in this exemplary embodiment, determination as to whether or not the power-off condition is satisfied is made on the basis of the cut-off level, continuous monitoring timer (time intervals of monitor), and abnormal count.

For example, when the personal computer 2A connected to the power line communication apparatus 20 having the serial number '1' is in use, the monitoring value is 2 A (Ampere), the cut-off level is 10%, the continuous monitoring timer is 1 second, and the abnormal count is three times. When the values are set as described above, if a state where a current equal to or larger than 2.2 A (Ampere) or equal to or smaller than 1.8 A flows for 1 second is repeated three times while the personal computer 2A is in use, it is determined that it is necessary to cut off the supply of power to the personal computer 2. In other words, if the power detection functioning section 26b1 (see FIG. 6) continuously detects the current equal to or larger than 2.2 A (Ampere) or equal to or smaller than 1.8 A for 3 seconds while the personal computer 2A is in use, the power-off functioning section 26b3 (see FIG. 6) operates to cut off the supply of power to the personal computer 2A.

Further, for example, when the personal computer 2A connected to the power line communication apparatus 20 having the serial number '1' is in 'LCD OFF,' the monitoring value is 1 A (Ampere), the cut-off level is 20%, the continuous monitoring timer is 5 seconds, and the abnormal count is twice. Accordingly, if the power detection functioning section 26b1 continuously detects a current equal to or larger than 1.2 A (Ampere) or equal to or smaller than 0.8 A for 10 seconds during 'LCD OFF' of the personal computer 2A, the power-off functioning section 26b3 determines that it is necessary to cut off supply of power to the personal computer 2A and then, cuts off the supply of power to the personal computer 2A.

Referring back to FIG. 7, an explanation continues. When all necessary fields in the initial setting table are filled (see FIG. 10), the personal computer 2A ends the management mode according to a user's instruction (step S107). Then, the personal computer 2A transmits, via the power line communication apparatus 20 having the serial number '1,' the set up contents (power monitoring information and restriction information) in the initial setting table to the respective power line communication apparatuses 10 and 20 having the corresponding serial numbers (step S108). Each power line communication apparatus 10, which receives the power monitoring information, stores the received power monitoring information in the power monitoring information storage section 16g2 of the storage section 16g. Also, each power line communication apparatus 20, which receives the power monitoring information, stores the received power monitoring information in a power monitoring information storage section (not shown) of the storage section 26g (step S109). Thus, the initial setting process is completed.

Figure 11:
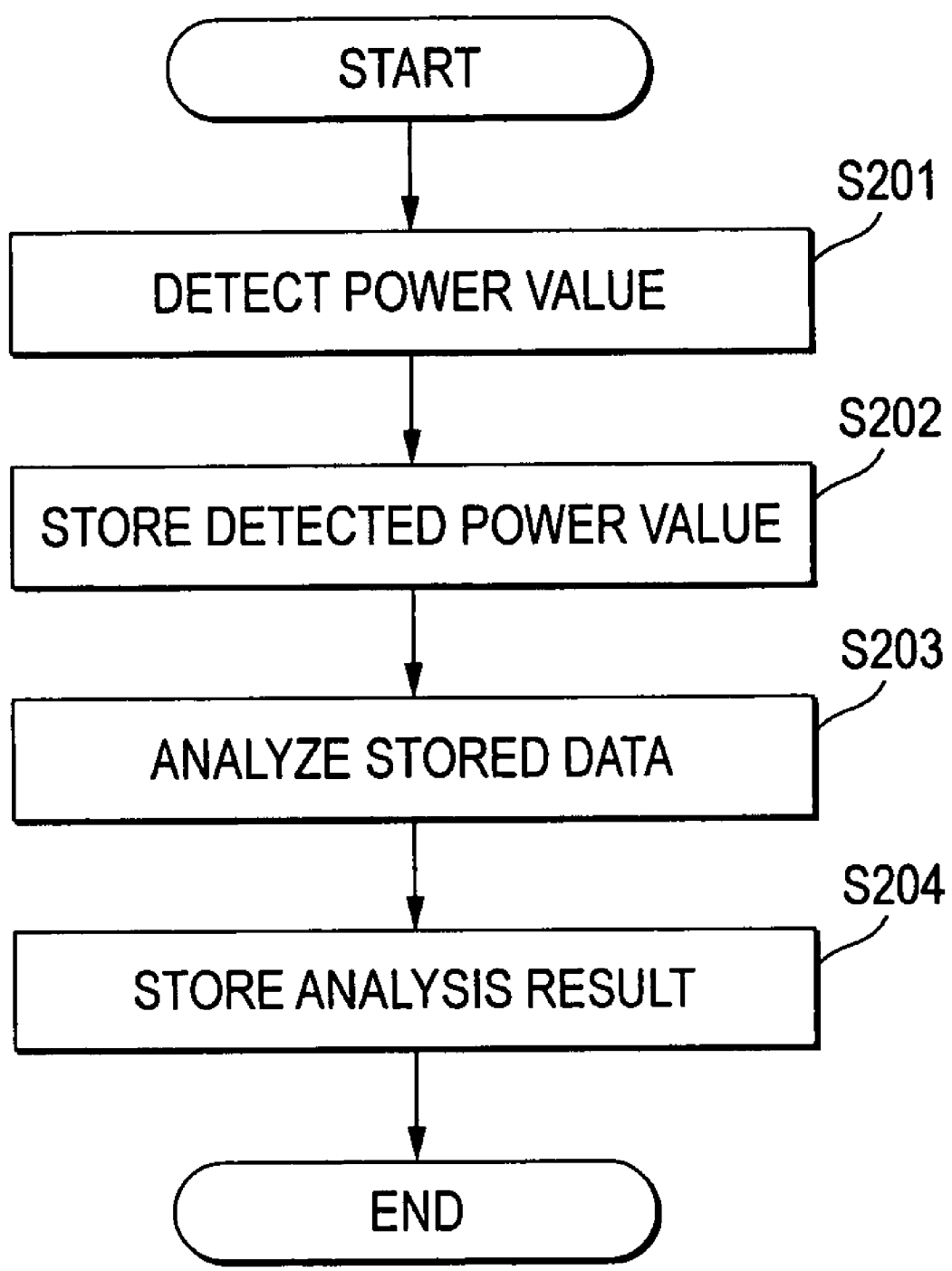
FIG. 11 is a flow chart illustrating a modification relating to a monitoring value.

FIG. 11 is a flow chart showing a modified example of the monitoring value.

The power detection functioning section 16b1 detects a value of power fed to an apparatus connected to the power line communication apparatus 10 (see FIG. 3) (step S201). Then, the detected value of power is stored in the storage section 16g (see FIG. 3) (step S202). After a predetermined time priod has elapsed, the stored power value (stored data) is analyzed (step S203), and then a result of the analysis is stored in the storage section 16g (step S 204). The stored analysis result may be used when a monitoring value is set in the initial setting table shown in FIG. 9. In this manner, the monitoring value may/be set by causing the power line communication apparatus 10 to have a learning function of monitoring, learning and storing variation in past current values (power values) and by considering fluctuation of the current values (power values).

Moreover, since the power line communication apparatus 20 includes the general-purpose communication functioning section 26b4 (see FIG. 6), it is possible to acquire mode information of the apparatus to which the power is fed. Thus, the above-described learning function may work for each operation mode.

Figure 12:
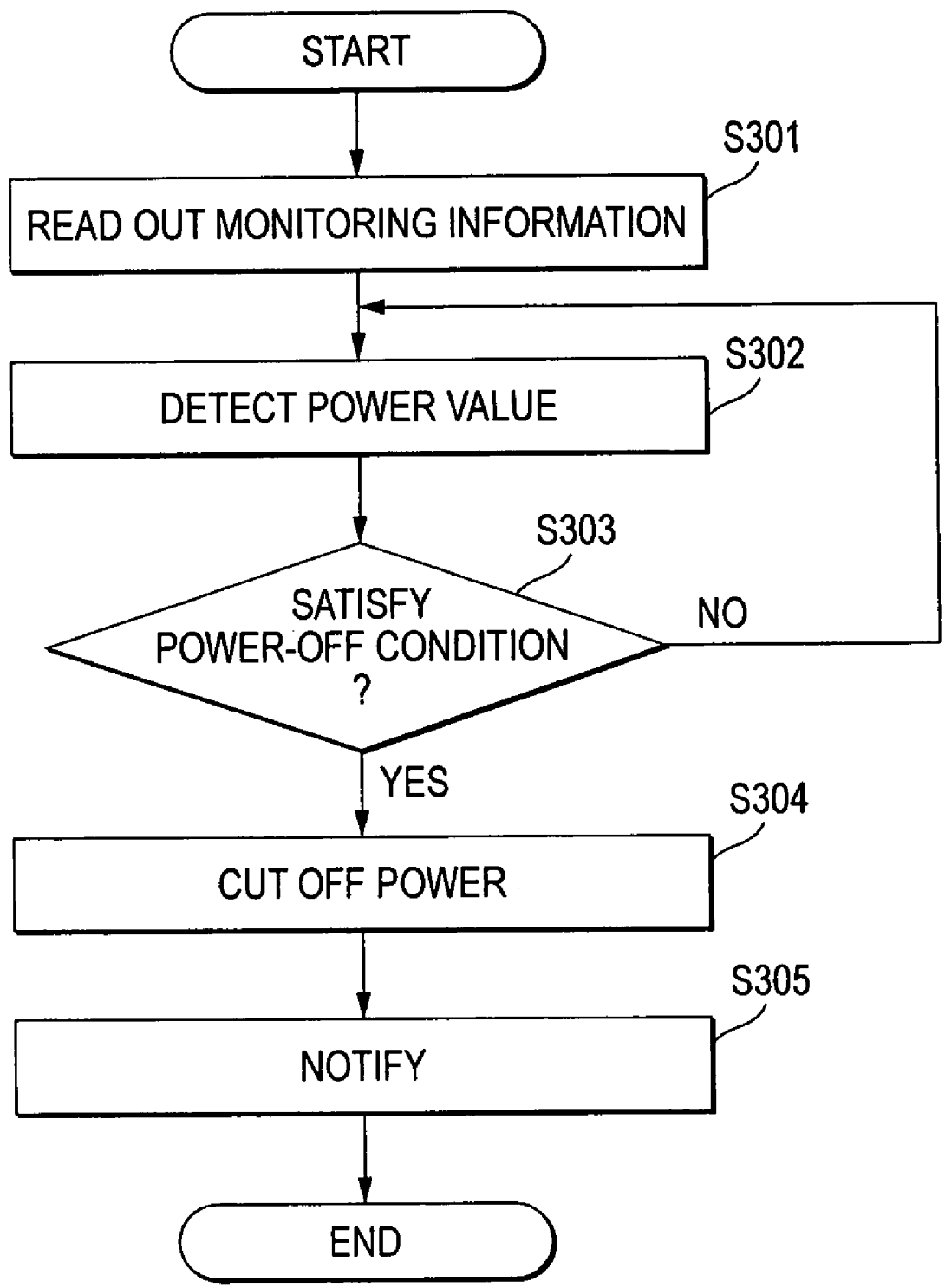
FIG. 12 is a flow chart illustrating a process procedure for cutting off power using the power line communication apparatus.

FIG. 12 is a flow chart illustrating process procedures when power is cut off using the power line communication apparatus 10.

In the power line communication apparatus 10, the power-off functioning section 16b3 (see FIG. 3) reads out power monitoring information stored in the power monitoring information storage section 16g2 (see FIG. 4) of the storage section 16g (step S301). Then, the power detection functioning section 16b1 (see FIG. 3) continuously detects a power value (current value) of the apparatus to which the power line communication apparatus 10 feeds the power (step S302). Then, the power-off functioning section 16b3 compares a result of the detection with the power monitoring information so as to determine as to whether or not a power-off condition is satisfied (step S303). If it is determined that the power-off condition is not satisfied, the process returns to the step S302. On the other hand, if it is determined that the power-off condition is satisfied, the power-off functioning section 16b3 cuts off power (step S304). When the power-off functioning section 16b3 cuts off the power, the power line communication functioning section 16b2 notifies to a janitor's room (not shown) connected to the power line PL according to preset procedures that the power is cut off (step S305).

Alternatively, when the power-off functioning section 16b3 cuts off the power, the power OFF may be notified to the user by displaying the power OFF notice on a notification section (not shown) provided in advance in the power line communication apparatus 10, for example, an LED display device or a liquid crystal display device.

Figure 13:
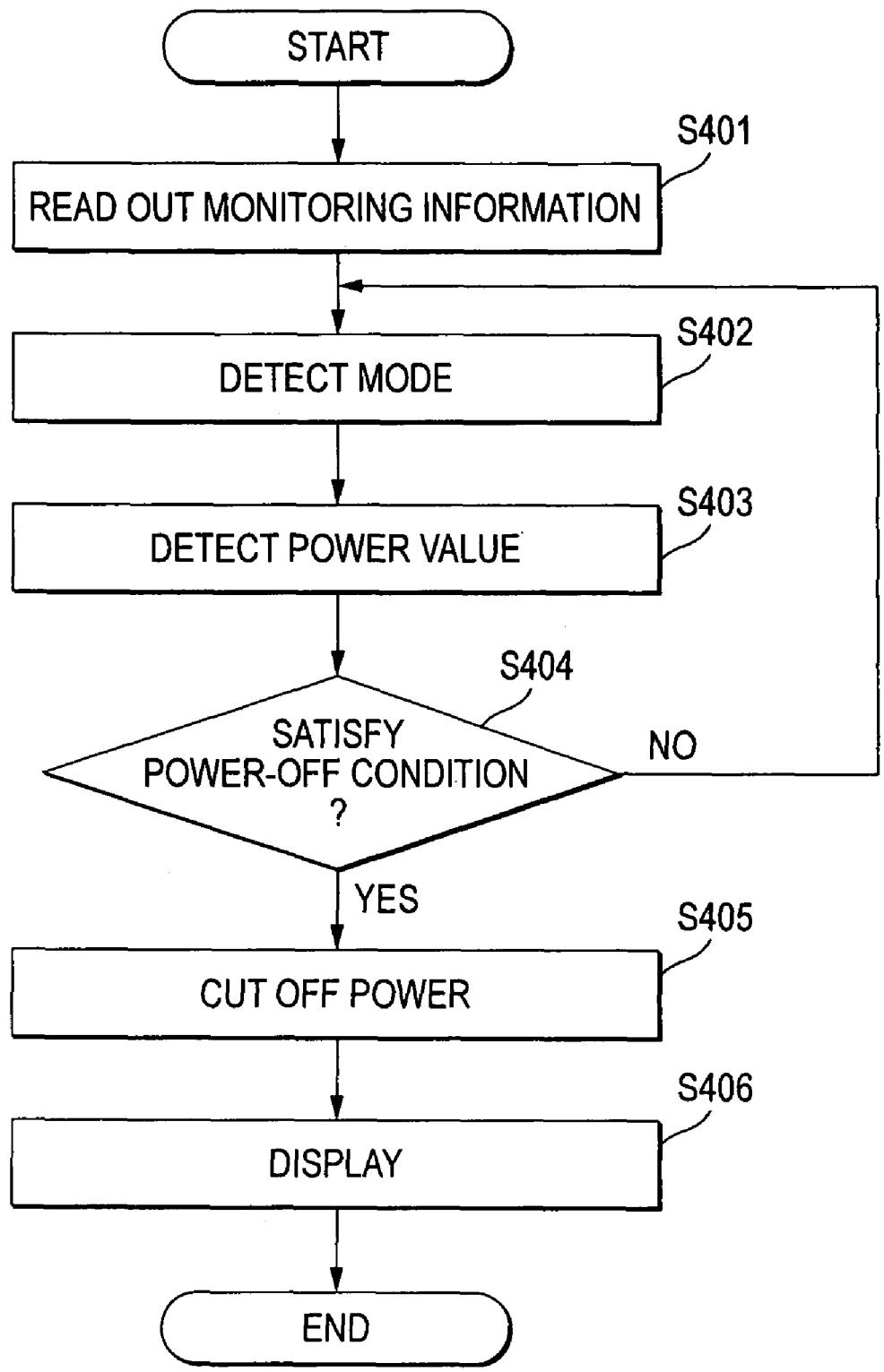
FIG. 13 is a flow chart illustrating a process procedure for cutting off power using the power line communication apparatus.

FIG. 13 is a flow chart showing process procedures when power is cut off using the power line communication apparatus 20.

In the power line communication apparatus 20, the power-off functioning section 26b3 (see FIG. 6) reads out power monitoring information stored in a power monitoring information storage section (not shown) of the storage section 26g (see FIG. 4) (step S401). Then, the general-purpose communication functioning section 26b4 (see FIG. 6) detects the operation mode of the connected apparatus (step S402). Then, the power detection functioning section 26b1 (see FIG. 6) continuously detects a power value of the connected apparatus fed to which the power line communication apparatus 20 feeds the power (step S403). Then, the power-off functioning section 26b3 compares a result of the operation mode detection, a result of the power value detection, and the power monitoring information with each other so as to determine whether or not the power-off condition is satisfied (step S404). If it is determined that the power-off condition is not satisfied, the process returns to the step S402. On the other hand, if it is determined that the power-off condition is satisfied, the power-off functioning section 26b3 cuts off power (step S405). When the power-off functioning section 26b3 cuts off the power, the general-purpose communication functioning section 26b4 displays the notice that the power is cutoff on a display screen of the connected apparatus (for example, the multi-function devices 1A to 1B and the personal computers 2A to 2D) to which the power line communication apparatus 20 feeds the power, so as to notify the user (step S406).

Here, as a timing when the power-off functioning section 26b3 cuts off the power, it may be considered to make a control so that the power is not cut off when the connected apparatus to which the power line communication apparatus 20 feeds the power is in the operation mode and that the power is cut off when the personal computers 2A to 2D switch to the standby mode, for example. In addition, when the power is cut off by the power-off functioning section 26b3, the state of power OFF caused by the power-off functioning section 26b3 may be released through UIs of the multi-function devices 1A to 1B or the personal computers 2A to 2D.

Figure 14:
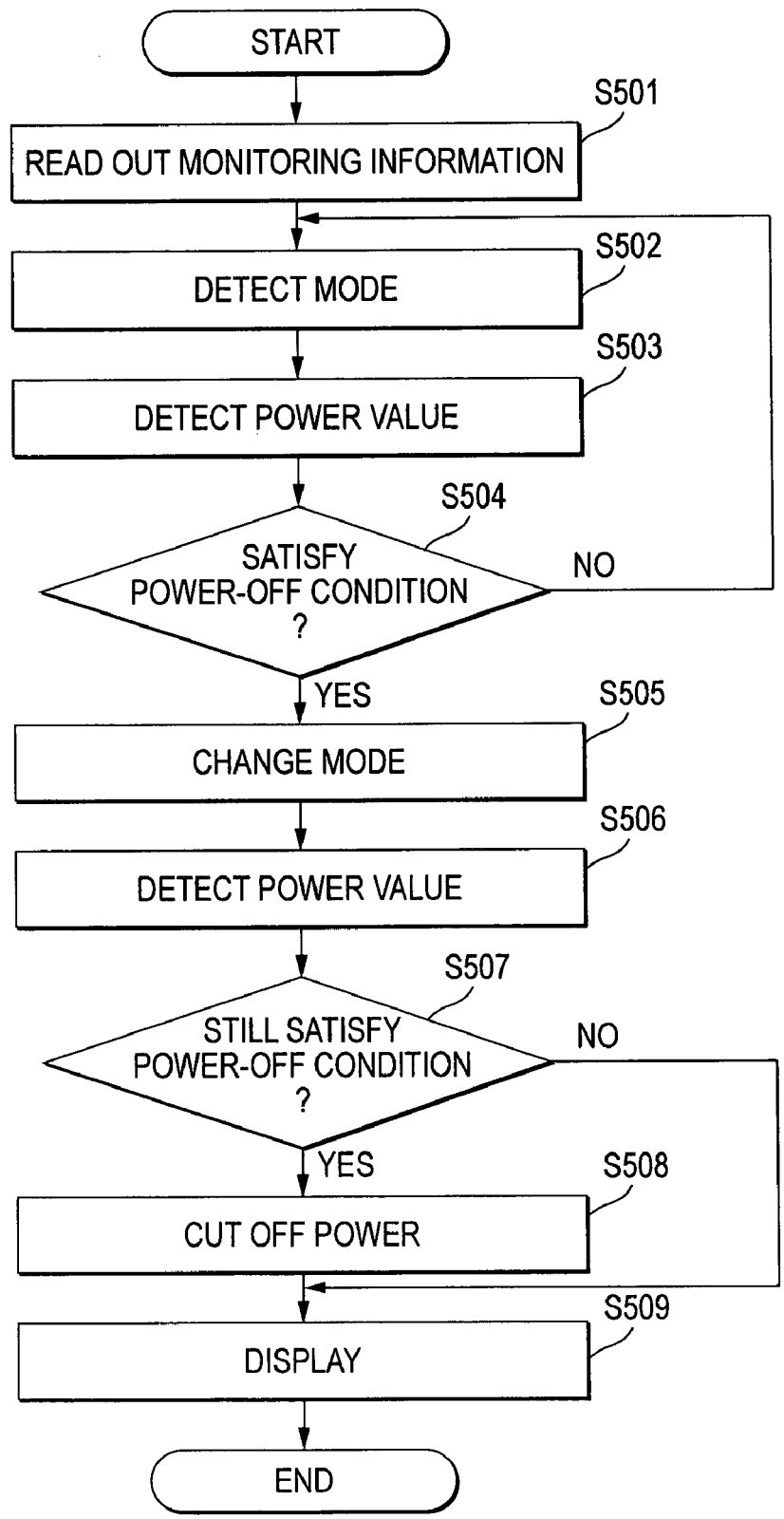
FIG. 14 is a flow chart illustrating a process procedure for cutting off power using the modified power line communication apparatus.

FIG. 14 is a flow chart showing process procedures according to a modified example of cutting off of the power by the power line communication apparatus 20.

The flow chart shown in FIG. 14 is different from that shown in FIG. 13 in that the power is not cut off immediately when it is determined that the power-off condition is satisfied. That is, in the flow chart shown in FIG. 14, when it is determined that the power-off condition is satisfied, a power consumption mode is changed. Thereafter, if the power-off condition is not satisfied, the process procedure is completed without cutting off power. On the other hand, if the power-off condition is still satisfied even after the power consumption mode has been changed, the power is cut off. Accordingly, in the process procedures shown in FIG. 14, the power may not be cut off even if the power-off condition is satisfied. This means that the power-off condition may be referred to as a power restriction condition including the case where an amount of supplied power is zero.

Specifically, in the power line communication apparatus 20, the power-off functioning section 26b3 (see FIG. 6) reads out the power monitoring information stored in a power monitoring information storage section (not shown) of the storage section 26g (see FIG. 4) (step S 501). Then, the general-purpose communication functioning section 26b4 (see FIG. 6) detects an operation mode of the connected apparatus (step S502). Thereafter, the power detection functioning section 26b1 (see FIG. 6) continuously detects the power value of the connected apparatus to which the power line communication apparatus 20 feeds the power (step S503). Then, the power-off functioning section 26b3 compares a detection result of the operation mode, a detection result of the power value, and the power monitoring information with each other so as to determine as to whether or not the power-off condition is satisfied (step S504). If it is determined that the power-off condition is not satisfied, the process returns to the step S502.

If it is determined that the power-off condition is satisfied, the power-off functioning section 26b3 instructs the connected apparatus to change the operation mode through the general-purpose communication functioning section 26b4 (see FIG. 6) (step S505). For example, the power-off functioning section 26b3 instructs the connected apparatus to change to a power saving mode.

Thereafter, the power detection functioning section 26b1 (see FIG. 6) detects a value of power of the connected apparatus to which the power line communication apparatus 20 feeds the power (step S506), compares the instructed operation mode, the detection result of the power value, and the power monitoring information with each other, and determines as to whether or not the power-off condition is satisfied (step S507). If it is determined that the power-off condition is satisfied, the power-off functioning section 26b3 cuts off power (step S508) and the general-purpose communication functioning section 26b4 displays a notice that the power is cut off on a display screen of the connected apparatus to which the power line communication apparatus 20 feeds the power. Thereby, the user is notified (step S509). In the step S507, if it is determined that the power-off condition is not satisfied, the process goes to step S509.

Hereinafter, an application of this exemplary embodiment will be described with reference to FIG. 15.

Figure 15:
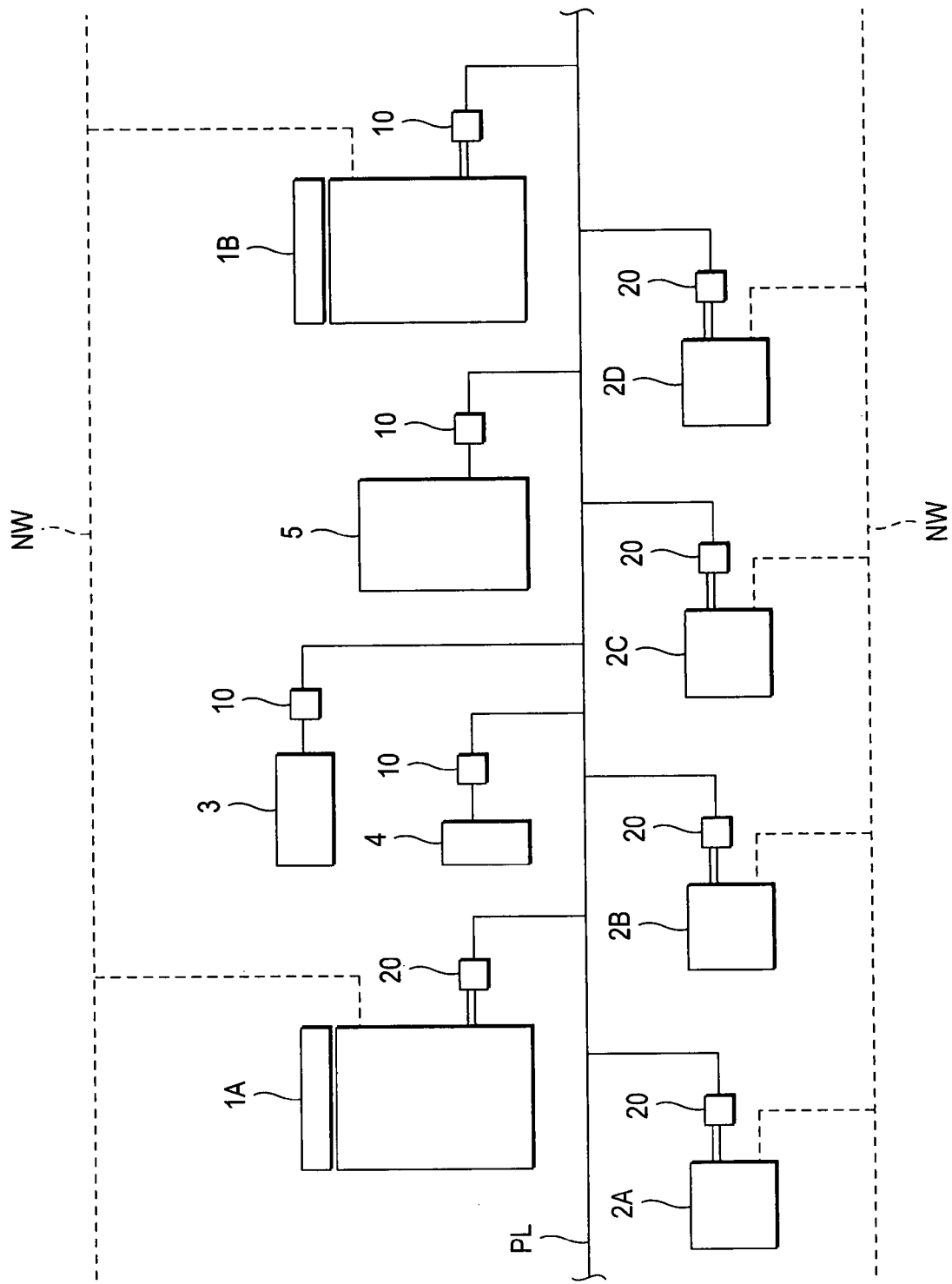
FIG. 15 is a schematic configuration view for explaining a power feeding system according to a modification example of the exemplary embodiment.

FIG. 15 is a view schematically explaining the configuration of a power feeding system according to an application of this exemplary embodiment.

As shown in FIG. 15, the multi-function devices 1A and 1B and the personal computers 2A to 2D are connected to the existing network NW. In addition, the power line communication apparatus 10 feeds power to the multi-function machine 1B.

Thus, even when the multi-function devices 1A and 1B are used as network printers of the personal computers 2A to 2D, this exemplary embodiment may be applied.

Further, various kinds of processes described in the exemplary embodiment are realized by application programs executed in the control units 16b and 26b, by using the storage units 16g and 26g that are working memories. The application programs may be installed in the power line communication apparatuses 10 and 20 when the power line communication apparatuses 10 and 20 are supplied to customers (including users). Alternatively, programs for execution of the power line communication apparatuses 10 and 20 may be supplied in the form of, for example, a storage medium readable by the power line communication apparatuses 10 and 20. For example, a CD-ROM medium corresponds to the storage medium, and the programs are read by a CD-ROM reader (not shown) to be executed. Alternatively, the programs may be supplied through the power line PL by means of a program transmission apparatus (not shown), for example. Alternatively, in the power line communication apparatus 20, the programs may be supplied through the external interface 28.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power feeding system comprising:
a plurality of power feeding apparatuses for a corresponding plurality of external apparatuses, each power feeding apparatus coupled between a power line and the corresponding external apparatus,
each including a power feeding unit that feeds power from the power line to the external apparatus corresponding to each power feeding apparatus,
a power line communication unit that communicates with another power feeding apparatus via the power line, which is a communication medium,
a power information detection unit that detects a power status of the corresponding external apparatus as power information relating to power of the corresponding external apparatus, and
a restriction unit that restricts the feeding of the power to the corresponding external apparatus, based on at least one of (i) the power information detected by the power information detection unit and (ii) information acquired from said another power feeding apparatus by the power line communication unit,
wherein each of the plurality of power feeding apparatuses stores a power feeding apparatus identification number and information regarding when feeding of the power to the corresponding external apparatus is to be restricted,
one of the external apparatus includes a management mode that is detectable by the corresponding power feeding apparatus,
when the management mode is detected, the corresponding power feeding apparatus notifies each other of the plurality of power feeding apparatuses of the management mode,
when notified of the management mode, said each other of the plurality of power feeding apparatuses sends the respective power feeding apparatus identification number, and information regarding a type of the corresponding external apparatus that said each other of the plurality of power feeding apparatuses is connected, to the one of the external apparatus via the corresponding power feeding apparatus,
in the management mode, the information regarding when feeding of the power to the corresponding external apparatus is to be restricted is input by a user of the one of the single external apparatus, and
at an end of the management mode, the one of the external apparatus sends the information regarding when feeding of the power to the corresponding external apparatus is to be restricted to said each of the plurality of power feeding apparatuses, using the power feeding apparatus identification number, for storage.

2. The system according to claim 1, wherein: each power information detection unit measures a value of a current fed to the corresponding external apparatus as the power information.

3. The system according to claim 1, wherein when the restriction unit of one power feeding apparatus restricts the feeding of the power to an external apparatus corresponding to the one power feeding apparatus, the one power feeding apparatus notifies another power feeding apparatus, via the power line communication unit of the one power feeding apparatus, that the restriction unit restricts the feeding of the power.

4. The system according to claim 1, wherein:
each power feeding apparatus further comprises an external apparatus communication unit that communicates with the corresponding external apparatus, and
the external apparatus communication unit receives status information of the external apparatus.

5. A power feeding apparatus coupled between a power line and a single external apparatus, comprising:
a power feeding unit that feeds power from the power line to the single external apparatus;
a power line communication unit that communicates with another power feeding apparatus via the power line, which is a communication medium, said another power feeding apparatus being coupled between the power line and another single external apparatus;
a power information detection unit that detects a power status of the single external apparatus as power information relating to power of the single external apparatus; and
a restriction unit that restricts the feeding of the power to the single external apparatus, based on at least one of (i) the power information detected by the power information detection unit and (ii) information acquired from said another power feeding apparatus by the power line communication unit,
wherein the power feeding apparatus and said another power feeding apparatus store a respective power feeding apparatus identification number and respective information regarding when feeding of the power to the respective external apparatus is to be restricted,
the external apparatus includes a management mode that is detectable by the power feeding apparatus, when the management mode is detected, the power feeding apparatus notifies said another power feeding apparatus of the management mode,
when notified of the management mode, said another power feeding apparatus sends the respective power feeding apparatus identification number, and respective information regarding a type of said another single external apparatus that said another power feeding apparatus is connected, to the single external apparatus via the power feeding apparatus,
in the management mode, the information regarding when feeding of the power to the external apparatus and said another single external apparatus is to be restricted is input by a user of the external apparatus, and
at an end of the management mode, the single external apparatus sends the information regarding when feeding of the power to said another single external apparatus is to be restricted to said another power feeding apparatuses, using the respective power feeding apparatus identification number, for storage.

6. A non-transitory computer readable storage medium storing a program causing a computer to perform a process for power feeding by a power feeding apparatus coupled between a power line and a single external apparatus, the process comprising:
feeding power from the power line to the single external apparatus;
communicating with another power feeding apparatus via the power line, which is a communication medium, said another power feeding apparatus being coupled between the power line and another single external apparatus;
detecting a power status of the single external apparatus as power information relating to power of the single external apparatus; and
restricting the feeding of the power to the single external apparatus, based on at least one of (i) the detected power information and (ii) information acquired from said another power feeding apparatus by communication through the power line, wherein the power feeding apparatus and said another power feeding apparatus store a respective power feeding apparatus identification number and respective information regarding when feeding of the power to the respective single external apparatus is to be restricted, the single external apparatus includes a management mode that is detectable by the power feeding apparatus, when the management mode is detected, the power feeding apparatus notifies said another power feeding apparatus of the management mode, when notified of the management mode, said another power feeding apparatus sends the respective power feeding apparatus identification number, and respective information regarding a type of said another single external apparatus that said another power feeding apparatus is connected, to the single external apparatus via the power feeding apparatus, in the management mode, the information regarding when feeding of the power to the single external apparatus and said another single external apparatus is to be restricted is input by a user of the single external apparatus, and at an end of the management mode, the external apparatus sends the information regarding when feeding of the power to said another single external apparatus is to be restricted said another power feeding apparatuses, using the respective power feeding apparatus identification number, for storage.

7. The computer readable medium according to claim 6, wherein the process further comprises:

notifying said another power feeding apparatus that the feeding of the power is restricted.

8. The computer readable medium according to claim 6, wherein the process further comprises:

communicating with the external apparatus to which the power is fed, so as to acquire status information of the external apparatus.

9. The system according to claim 1, wherein each power feeding apparatuses further comprises:

a power switching section that is disposed on a downstream side of the power feeding unit, the power switching section is switched OFF to restrict feeding of the power to the corresponding external apparatus.

10. The power feeding apparatus according to claim 5, wherein each of the power feeding apparatus and said another power feeding apparatus further comprises:

a power switching section that is disposed on a downstream side of the power feeding unit, the power switching section is switched OFF to restrict feeding of the power to the respective external apparatus.

11. The computer readable medium according to claim 6, wherein each of the power feeding apparatus and said another power feeding apparatus further comprises:

a power switching section that is disposed on a downstream side of the power feeding unit, the power switching section is switched OFF to restrict feeding of the power to the respective external apparatus.

\* \* \* \* \*